United States Patent [19]
Villette et al.

[11] Patent Number: 5,613,107
[45] Date of Patent: Mar. 18, 1997

[54] METHOD AND APPARATUS FOR MANAGING FILE VERSIONS IN AN INFORMATION PROCESSING SYSTEM BASED ON A PREDETERMINED AMOUNT OF STORAGE MEDIA

[75] Inventors: Michel Villette, Le Chesnay; Rémi Cayuela, Marly-Le-Roi, both of France

[73] Assignee: Bull, S.A., Paris, France

[21] Appl. No.: 169,403

[22] Filed: Dec. 20, 1993

[30] Foreign Application Priority Data

Dec. 22, 1992 [FR] France ................................. 92 15520

[51] Int. Cl.$^6$ ................................................. G06F 13/00
[52] U.S. Cl. ................. 395/617; 395/182.11; 395/405; 364/DIG. 1; 364/282.1; 364/243; 364/222.81
[58] Field of Search ......................... 395/600, 405, 395/182.11; 364/DIG. 1

[56] References Cited

U.S. PATENT DOCUMENTS

| | | | |
|---|---|---|---|
| 4,714,996 | 12/1987 | Gladney et al. | 364/300 |
| 5,019,963 | 5/1991 | Alderson et al. | 364/200 |
| 5,136,707 | 8/1992 | Block et al. | 395/600 |
| 5,155,847 | 10/1992 | Kirouac et al. | 395/600 |
| 5,271,013 | 12/1993 | Gleeson | 371/9.1 |
| 5,287,459 | 2/1994 | Gniewek | 395/275 |
| 5,379,429 | 1/1995 | Hirasawa et al. | 395/700 |
| 5,418,945 | 5/1995 | Carter et al. | 395/600 |
| 5,495,610 | 2/1996 | Shing et al. | 395/600 |

OTHER PUBLICATIONS

Software Practice & Experience, vol. 16, No. 8, Aug. 1986 Chichester GB, pp. 772–778, Brereton, O.P., "Management of Replicated Files in a UNIX Environment".

Software Practice & Experience, vol. 21, No. 7, Jul. 1991, Chichester GB, pp. 657–675, Cheng et al. "Design and Implementation of a Distributed File System".

Software Practice & Experience, vol. 15, No. 7, Jul. 1985, Chichester, GB, pp. 637–654, Tichy, W.F., "RCS–A System for Version Control".

*Primary Examiner*—Thomas G. Black
*Assistant Examiner*—Jean R. Homere
*Attorney, Agent, or Firm*—Kerkam, Stowell, Kondracki & Clarke, P.C.; Edward J. Kondracki

[57] ABSTRACT

A method for managing a file including updating the file by incrementing by one unit the numbers of successive versions of the file that are available in at least two media (S0–S4), and, in normal operation, all the available media after election of a majority version (MV), and rewriting the majority version in the media not containing it, and subsequent to unavailability of a medium, updating all the available media after election and rewriting the majority version and incrementing its version number by two units.

18 Claims, 2 Drawing Sheets

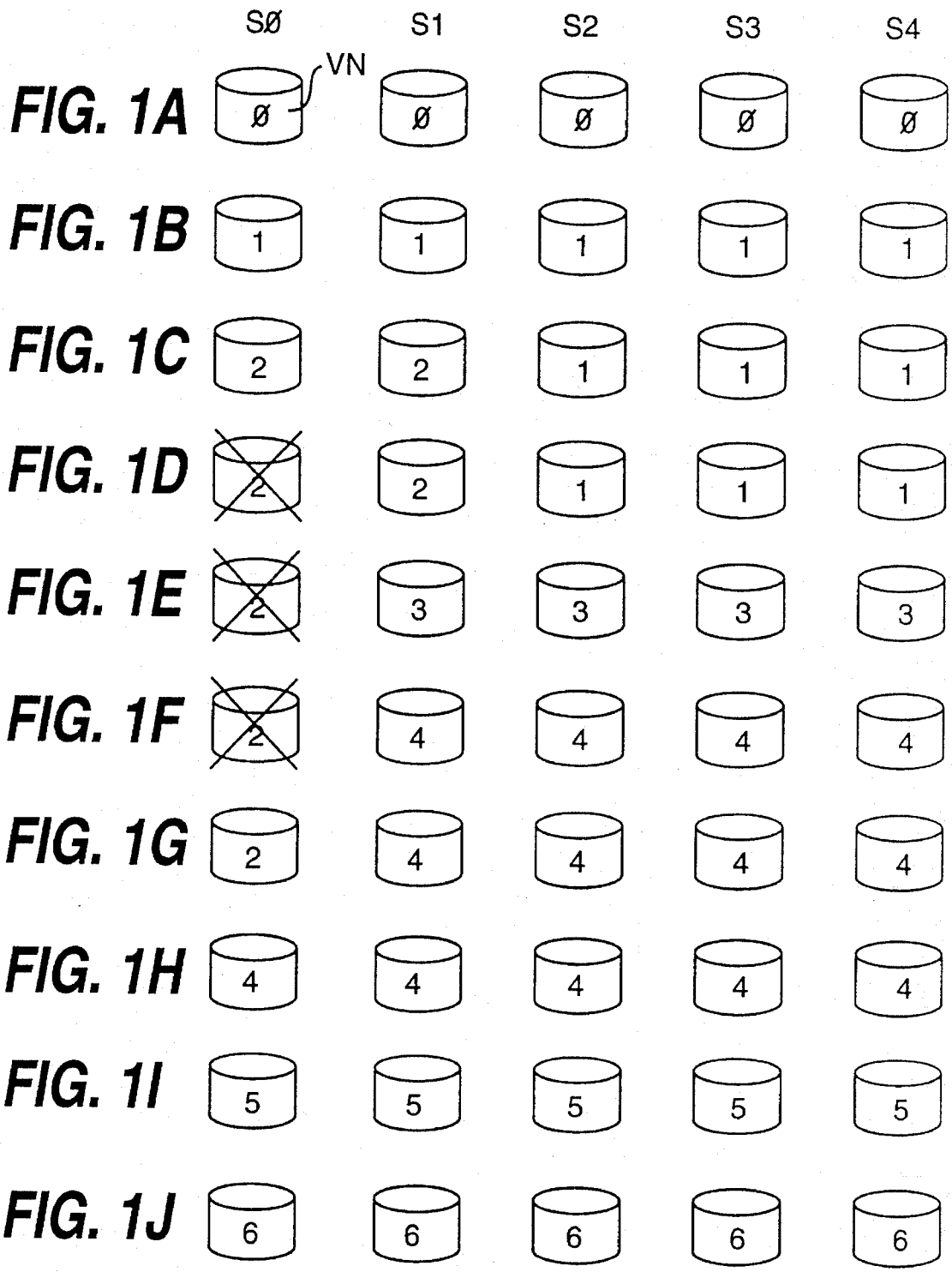

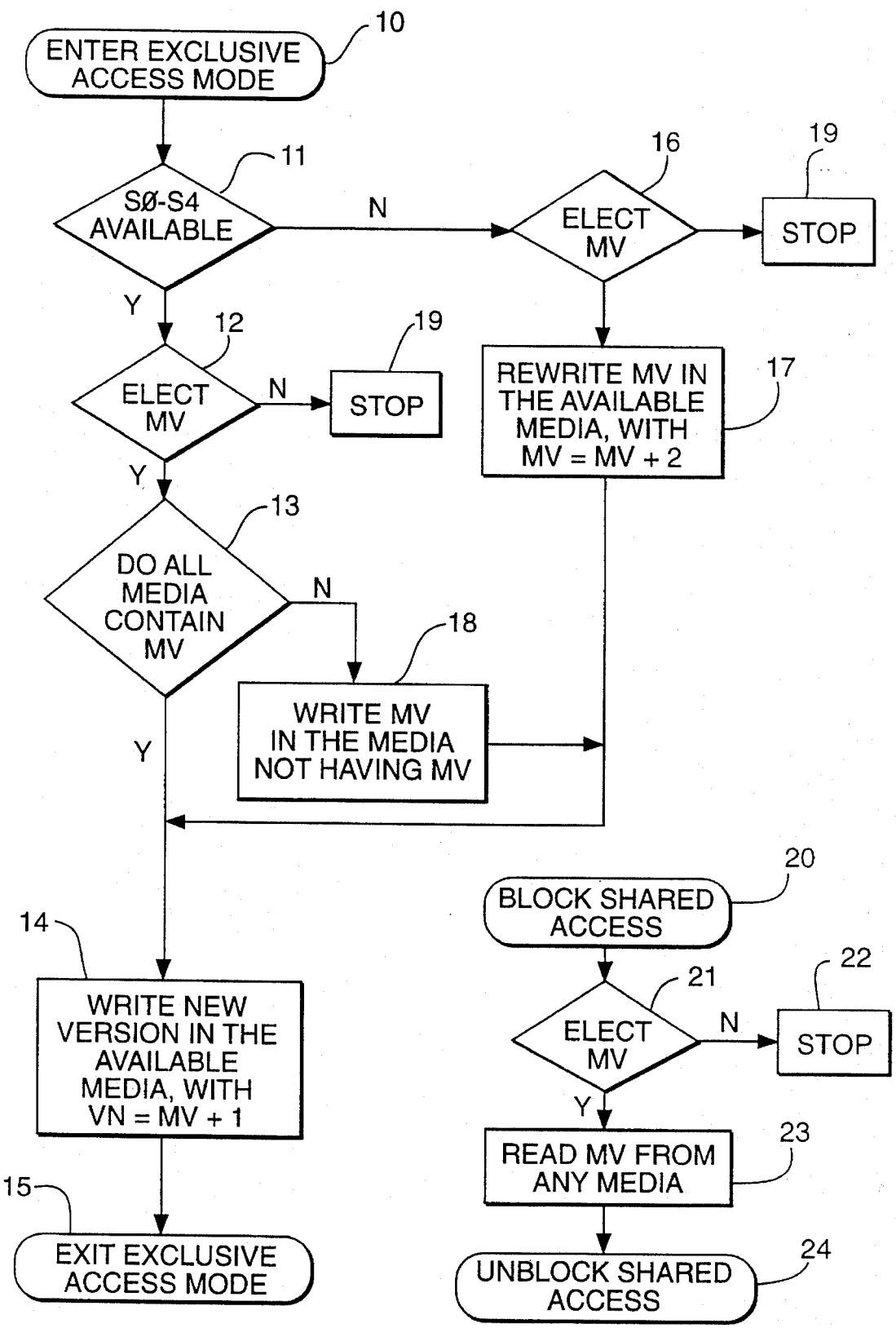
*FIG. 2A*  *FIG. 2B*

METHOD AND APPARATUS FOR MANAGING FILE VERSIONS IN AN INFORMATION PROCESSING SYSTEM BASED ON A PREDETERMINED AMOUNT OF STORAGE MEDIA

OBJECT OF THE INVENTION

The invention relates to a method of file management. More generally, it applies to information processing systems for managing information files and more particularly to improving the availability of files. It also relates in corollary fashion to the recording medium that incorporates software for implementing the method, and to an information processing system for employing the method.

BACKGROUND OF THE INVENTION

Information files are generally stored in magnetic media, disks or tapes. None of these media can achieve a total guarantee of availability. The unavailability of a medium may have multiple causes, ranging from simple error, which can be repaired to restore the entire file contained in the medium, to the complete destruction of the physical medium and its files. Even though non-rewritable digital optical disks, for instance, guarantee file fidelity and durability, the physical medium can still become damaged, for instance when being handled. A method of file management is accordingly necessary, in order not to lose the data in the files.

At present, file management and file archiving consists of making one or more copies on similar recording media in order to increase their availability. However, files evolve, beginning with their development, and frequently go through several versions. This evolution presents a grave problem in the event that the machine that handles the files breaks down, or in the event of partial or total deterioration of the medium on which the files are stored.

A disk defect can be repaired, and the disk may become entirely or partially available again. Similarly, a machine breakdown can erase a new part of the file, and its repair can leave the user in either a certain situation or an uncertain configuration. The problem becomes much more serious when the files can be handled by various persons through various remotely located machines. For these persons, it becomes imperative to manage the availability of files and of their various versions without the risk of losing their updated version or creating an inconsistency in the existence of various available versions.

However, the current solution for file management presents one major problem in the event of intermittent breakdown in at least one of their media. The classic solution is to increment the numbers of successive versions by one unit. Thus if one of the media fails in a breakdown, one can find out which of the available versions is the most recent simply by looking at the numbers of the available versions on the other media. However, when working fast, this solution proves inadequate because of intermittent failures in at least one of the media. For example, let it be assumed that there are five identical copies of version 1 on five respective media. A user makes a modification in one of the media, producing version 2. If the medium becomes unavailable, the user or other users of the same machine or other machines then looks among the four identical versions carrying the number 1 to update them and make a new version, which will then be called version 2. Eventually, the disk that failed will have been repaired, and the repaired disk is returned to service, making the first version available; this version also carries number 2, but it is normally different from the second version number 2 made on the other media. Confusion ensues, producing varying files having the same version numbers. Moreover, another intermittent failure in one of the media will produce renewed confusion. It will be appreciated that in practice, the copies rapidly become inconsistent.

SUMMARY OF THE INVENTION

The invention solves this problem that results from intermittent media failures and provides a method for managing copies or versions of files that has the advantage of being implemented easily, while offering great certainty in use and, in the majority of cases, allowing automatic operation.

The main object of the invention is to provide a method for managing a file, including the step of updating of the file by incrementing by one unit the numbers of successive versions of the file that are available in at least two media, wherein the method consists of updating, in normal operation, all the available media after election of a majority version, and rewriting the majority version in the media not containing it, and subsequent to unavailability of a medium, updating all the available media after election and rewriting the majority version and incrementing its version number by two units.

A recording medium and an information processing system that employ the present method are also subjects of the present invention.

BRIEF DESCRIPTION OF THE DRAWINGS

Other characteristics and advantages of the present invention will become apparent from the ensuing description, given by way of example and illustrated in the accompanying drawings, in which:

FIGS. 1A–1J illustrate one example for managing 5 copies of a file in accordance with the method of the present invention; and FIGS. 2A and 2B are two diagrams showing the writing and reading of files done in accordance with the present method for managing the 5 file copies shown in FIGS. 1A–1J.

DETAILED DESCRIPTION OF THE PREFERRED EMBODIMENTS

FIG. 1A illustrates a number n=5 of media S0–S4 for recording a file newly created with the version number VN=0. The media may be of types similar to or different from one another, such as hard disks, magnetic diskettes, optical disks, and magnetic tapes.

FIGS. 1B–1J illustrate various steps in the file management by the method of the present invention. The steps involved in writing the file to update it and reading the file, in accordance with the method of the present invention, are illustrated in the flow charts of FIGS. 2A and 2B, respectively. According to the invention, a majority version MV of the file that is recorded on all n media, whether or not these media are accessible, is defined. Depending on the particular implementation of the present method, a version number VN is called the majority version MV if, and only if, in the strict sense more than half of all n media are accessible and contain this version. In the example shown, a version will accordingly be the majority version if it is contained in at least three of the five media.

Referring to FIGS. 1A and 2A, if one now wants to write in version VN=0 of the file to update it, the writing process begins by blocking access to the media S0–S4, corresponding to the exclusive access mode (block 10 of the diagram). The writing process consists of first checking whether all the media S0–S4 are accessible (block 11 of the diagram). Assuming in the present case that all the media S0–S4 of FIG. 1A are accessible, the writing process then elects the majority version MV among the five media (block 12). In the example shown in FIG. 1A, the majority version MV has version number VN=0. The method continues, by checking whether all the media contain the majority version MV=0 (block 13). This being the case illustrated in FIG. 1A, the new version is written in all the media S0–S4 under the version number VN=MV+1, where MV is the number of the majority version, or in this case VN=1 (block 14). The writing is completed by unblocking access to the media (block 15).

Preferably, writing the new version of the file in all the media is done successively. In fact, if the writing is done in parallel in all the media and is interrupted, for instance by a power outtage, then all the media will be effected by this interruption. It follows then that the original version VN=0 is no longer available, and the new version that would carry the next version number VN=1 will actually include only part of the new version which was written before the interruption. Thus, successive writing offers the advantage of always having one complete copy of the original version available before writing the new version of the file in the last medium, and hence of preserving at least one copy of the new version if an accident occurs after the new version has been written in at least one of the media.

FIG. 1C shows an example of interrupted updating of the file in a new version carrying number VN=2. In this example, the two media S0 and S1 have received the new version, while the other media S2–S4 preserve the preceding version, numbered 1.

In FIG. 1D, it has been assumed that the medium S0 has also become unavailable when an attempt is made to write a new version. Turning to FIG. 2A, after access to the media has been blocked, the search made in block 11 confirms the unavailability of the medium S0 and furnishes a negative result, leading to block 16 of the diagram. In this block, the majority version is elected from among the four media S1–S4 that are still available. In the example shown in FIG. 1D, the version numbered 1 is contained in the media S2, S3 and S4, while the version numbered 2 is contained only in the medium S1. Hence the majority version MV has the number VN=1. Since the result of the search and determination of the majority version MV made in block 16 was successful, it leads to block 17 of the diagram. At this step 17 in the method of the present invention, the majority version MV is rewritten in all the available media S1–S4 with the number MV=MV+2. In the present case, since the majority version has the number 1, this version is then rewritten as number 3, as shown in FIG. 1E. For the same reasons as before, the rewriting is preferably done successively. The method of the invention then proceeds to a step identified as block 14 of the diagram. In this step, the new version that one wants to record in all the available media S1–S4 is written there with number VN=MV+1; hence VN=4, as shown in FIG. 1F.

In FIG. 1G, it is assumed that the unavailable medium S0 has been repaired and put back in among the other media S1–S4. The medium S0 carries version number VN=2, while the other media S1–S4 carry version number 4. New updating is done in accordance with the method of the invention, illustrated in FIG. 2A. After access to the media is blocked, the search done in step 11 confirms that all the media are available, and then continues to step 12. In this step 12, the majority version MV elected carries version number VN=4. The method then proceeds to step 13, where it is confirmed that not all the media contain the majority version. The method then proceeds to a new step, shown in block 18 of the diagram. This step 18 consists of writing the majority version MV in the media that do not contain it. In this particular case, the majority version MV=4 is written in the medium S0, replacing the version carrying number 2, as illustrated in FIG. 1H. The method then proceeds to the step illustrated by block 14. The new version is then written in all the media S0–S4, carrying the number VN=MV+1, in this case VN=5, as shown in FIG. 1I. The writing is then completed in block 15 with the step of unblocking the shared access to the media.

New updating without unavailability of the media is then done in the same way as described in conjunction with FIG. 1A and leads to the situation shown in FIG. 1J, where all the media carry the version with number 6.

It should be noted that if in blocks 12 and 16, the election of a majority version MV proves impossible, then the method goes into a check state and stops as illustrated by the corresponding blocks 19 of the diagram. In practice, however, the absence of a majority version is rare, since it only occurs when more than half the media are or have been unavailable at virtually the same time. If this occurs, however, an intervention must be made, in order to eliminate one or more copies in such a way that one version becomes the majority version again.

FIG. 2B shows an exemplary diagram of the steps involved in reading a file, in accordance with the present invention. The method begins at block 20 by blocking access to the media in a shared mode. It then proceeds to block 21 to elect the majority version MV. In the absence of that version, reading becomes impossible, because of the dilemma present by the existence of two competing versions. The method then stops at block 22 to request human intervention to determine which of the two versions is the majority version. Conversely, if a majority version is elected, reading is done in any of the media containing the majority version (block 23). After reading is completed, the reading method arrives at block 24 which unblocks access to the media.

In general, the example set forth above, and illustrated in the drawings described the present method for managing a file that includes updating the file in the conventional manner by incrementing by one unit the version numbers of successive versions of the file that are available in at least two media. In accordance with the present invention the method includes updating, in normal operation, all the available media after having elected a majority version and rewriting the majority version in the media that do not contain it, and subsequent to the unavailability of a medium, updating all of the available media after having elected and rewritten the majority version under a number equal to the majority version number incremented by two units.

It has been seen in the example shown that the method consists of electing as the majority version MV the version contained in more than strictly half of the total number of media. In this particular embodiment, it is also apparent from the example described and shown that the method of the invention cannot be effective unless the total number n of media equals at least 3. In fact, by using three media, the defectiveness of one medium still makes it possible to establish a majority version if the other two media carry the same version. If n=2, a defect in one of the media leaves no choice in election of the majority version; that version then corresponds to strictly half the number of media, which is 2, rather than to more than strictly half as required by the above definition. However, it will be seen that a less restrictive definition of the majority version is possible, but using it may be less effective than using the one given above. It will be appreciated that the minimum number of media for implementing the method of the invention depends in particular on the definition of the majority version. The number must necessarily be 2, for a nonrestrictive definition, and may be greater than 3, if a more restrictive definition is given. The example shown makes a good compromise and constitutes the preferred embodiment of the invention.

It has also been seen that in the example described, updating by the method of the invention consists, in the step of block 11, of checking whether all of the media are available before electing the majority version. This solution facilitates the flow of the method, as is apparent from FIG. 2A.

Also in this example, the method is interrupted if a majority version cannot be elected. However, it is clear that other solutions are possible, such as taking the version with the highest number VN.

The example shown also highlights the advantage of updating all the media successively and also rewriting the majority version successively in them.

Finally, FIG. 2B of the example shown has demonstrated that advantageously, reading the file consists of looking for the majority version and electing one of the media containing it.

It will be appreciated that the invention also relates to any recording medium incorporating file management software for implementing the method that has just been described in its general form, as well as the information processing system that employs this method. It will be understood from the above description that the invention is suitable for any mono- or multiprocessor information processing system, and that it is more particularly advantageous in a multiprocessor system.

What is claimed is:

1. A method of managing a file in an information processing system having a plurality of storage media which each contain a version of said file and a version number associated therewith, said method being implemented by said information processing system and comprising the steps of:

determining, when said file is to be replaced with an updated version, whether all of said plurality of media are available;

electing a reference version of said file from the available media of said plurality of media based on a predetermined criteria, said reference version having a first version number;

writing said reference version in any and all of the available media which do not have said reference version, so that all of the available media have said reference version;

assigning a second version number to said reference version that have all of the available media which is equal to either said first version number if all of the plurality of media are available or said first version number plus two units if at least one medium of said plurality of media is not available;

writing said updated version of said file in all available media; and assigning a third version number to said updated version of said file on all available media which is equal to the second version number plus one unit.

2. The method of claim 1, wherein said predetermined criteria is based on a predetermined minimum number of said plurality of storage media included in said information processing system.

3. The method of claim 1, wherein the step of writing said reference version includes writing said reference version successively in all available media.

4. The method of claim 1, wherein the information processing system includes at least three storage media and the step of electing a reference version of said file from all available media includes electing a majority version (MV) defined as the version contained in more than strictly half of the total number of available media.

5. The method of claim 1, wherein the step of writing the reference version in all of the available media which do not have the reference version includes reading said reference version from one of the available media having the reference version and copying it in all of the available media which do not have the reference version.

6. The method of claim 1, wherein the step of electing a reference version of said file from all available media includes the step of causing an interrupt to occur if said reference version cannot be elected in accordance with said predetermined criteria.

7. The method of claim 1, wherein the step of writing said updated version of said file includes writing said updated version successively in each of said available media.

8. An information processing system having a plurality of media which are each operable to store a version of a file and a version number associated therewith, said system including means for managing said file wherein said means for managing said file includes:

means for determining, when said file is to be replaced with an updated version, whether all of said plurality of media are available;

means for electing a reference version of said file from all available media of said plurality based on a predetermined criteria, said reference version having a first version number;

means for writing said reference version in any and all of the available media which do not have said reference version, so that all of the available media have said reference version;

means for assigning a second version number to said reference version that have all of the available media which is equal to either said first version number if all of the plurality of media are available or said first version number plus two units if at least one medium of said plurality of media is not available;

means for writing said updated version of said file in all available media; and means for assigning a third version number to said updated version of said file on all available media which is equal to the second version number plus one unit.

9. The system of claim 8, wherein said predetermined criteria is based on a predetermined minimum number of said plurality of media included in said information processing system.

10. The system of claim 8, wherein the information processing system includes at least three storage media and said means for electing a reference version of said file from all available media includes means for electing a majority version (MV) defined as the version contained in more than strictly half of the total number of available media.

11. The system of claim 10, said means for electing a majority version includes means for causing an interrupt to occur if said majority version cannot be elected.

12. The system of claim 8, wherein said means for electing a reference version of said file from all available media includes means for causing an interrupt to occur if said reference version cannot be elected in accordance with said predetermined criteria.

13. The system of claim 8, wherein said means for writing said updated version of said file includes means for writing said updated version successively in each of said available media.

14. The system of claim 8, wherein said means for writing said reference version includes means for writing said reference version successively in all available media.

15. The system of claim 8, wherein the means for writing the reference version in all of the available media which do not have the reference version includes means for reading said reference version from one of the available media having the reference version and means for copying said reference version in all of the available media which do not have the reference version.

16. A computer-usable medium having a computer program embodied thereon for use in an information processing system having a plurality of media which are each operable to store a version of a file and a version number associated therewith, said computer program including means for managing said file and comprising:

means for determining, when said file is to be replaced with an updated version, whether all of said plurality of media are available;

means for electing a reference version of said file from the available media of said plurality of media based on a predetermined criteria, said reference version having a first version number;

means for writing said reference version in any and all of the available media which do not have said reference version, so that all of the available media have said reference version;

means for assigning a second version number to said reference version that have all of the available media which is equal to either said first version number if all of the plurality of media are available or said first version number plus two units if at least one medium of said plurality of media is not available;

means for writing said updated version of said file in all available media; and means for assigning a third version number to said updated version of said file on all available media which is equal to the second version number plus one unit.

17. The computer program of claim 15, wherein said predetermined criteria is based on a predetermined minimum number of said plurality of media included in said information processing system.

18. The computer program of claim 15, wherein the information processing system includes at least three storage media and said means for electing a reference version of said file from all available media includes means for electing a majority version (MV) defined as the version contained in more than strictly half of the total number of available media.

* * * * *